United States Patent [19]

Stache

[11] Patent Number: 4,834,326
[45] Date of Patent: May 30, 1989

[54] WING FLAP OPERATION

[75] Inventor: Ernst Stache, Weyhe, Fed. Rep. of Germany

[73] Assignee: MBB GmbH, Bremen, Fed. Rep. of Germany

[21] Appl. No.: 148,884

[22] Filed: Jan. 27, 1988

[30] Foreign Application Priority Data

Jan. 27, 1987 [DE] Fed. Rep. of Germany ....... 3702294

[51] Int. Cl.⁴ .............................................. B64C 13/28
[52] U.S. Cl. .................................. 244/213; 244/210; 244/215; 244/211
[58] Field of Search ............... 244/210, 211, 212, 213, 244/214, 215, 217, 75 R, 90 A, 90 R

[56] References Cited

U.S. PATENT DOCUMENTS 2,183,279 12/1939 McCorty, Jr. et al. ............ 244/215
2,494,208  1/1950 Schultz ............................. 244/213
4,533,096  8/1985 Baker et al. ...................... 244/213
4,717,097  1/1988 Sepstrup .......................... 244/215

FOREIGN PATENT DOCUMENTS 1392727  2/1965 France ............................ 244/213

Primary Examiner—Joseph F. Peters, Jr.
Assistant Examiner—Rodney A. Corl
Attorney, Agent, or Firm—Ralf H. Siegemund

[57] ABSTRACT

Adjusting device for landing flaps covering a gap between a landing flap or flaps and a wing proper there being a driven torsion shaft for driving the flaps, whereby particularly a transmission gear is drivingly coupled to the torsion shaft and includes a reducing gear and a gear segment being bidirectionally driven by the gear; a slotted cam is connected to and driven by the segment gear; a pair of levers with scanning elements is operated by the cam on rotation thereof; tension-compression rods are respectively linked to the levers such that the rods are operated in opposite direction; and a pair of elbow levers respectively connect the rods to two wing flaps such that the rods are tension loaded then compression loaded by the aerodynamic forces acting on the wing flaps.

3 Claims, 2 Drawing Sheets

WING FLAP OPERATION

BACKGROUND OF THE INVENTION

The present invention relates to the driving and adjusting of wing flaps in aircraft wherein particularly the wings have variable geometry; the operation of the wing flaps is to avoid the formation of a gap between the wing proper and the leading edge of a landing flap.

It is known to use landing flaps for changing the geometry in aircraft wing so as to make particular use of them also during cruising. However, generally speaking a gap can readily form between the wing proper and the landing flap. These gaps can e.g. be covered through deflector doors (see e.g. German patent applications P 36 41 247.3 - 22 and P 31 14 143). The problem is that the gap that forms between the leading flap and the wing proper does not have a constant or invariable configuration but depends on the degree of extension and/or deflection of the leading flap. Hence the operation of wings and flaps including structure for covering that gap and to adapt to the various positions of the gap, is a formidable problem.

DESCRIPTION OF THE INVENTION

It is an object of the present invention to provide a new and improved wing flap operating structure that moves in dependence upon landing flap positions and avoids the formation of gaps between wing and landing flap.

In accordance with the preferred embodiment of the present invention, the object is attained by a transmission gear being driven by a torsion shaft which gear includes a reducing worm gear and a segmented gear disk which in turn is connected to a cam mounted on a shaft to permit deflection over particular angle in two directions. The cam has two tracks respectively associated with linkage levers and contour rollers as follower elements; the levers are respectively hinged or articulated to tension-compression rods, on left and right hand sides of the gear so that owing to this arrangement the latter rods operate elbow levers in opposite directions. The elbow levers in turn are respectively connected to two wing flaps. Moreover, the elbow lever linkage and rods are arranged such that the tension-compression rods are loaded by the aerodynamic acting on the flaps stronger during tension than for compression. The operation of the wing flaps deflects them by means of particular angles from a zero position.

The particular advantage of the invention is to be seen in the utilization of but one linkage transmission per wing portion under utilization of elbow levers and tension rods for operating the wing flaps replacing conventional drive shafts because the conventional drive shafts do not permit synchronous movement oweing to the torsion forces. Avoidance of this problem is deemed to be the principal contribution of the invention. Moreover, utilization of cams in conjunction with the gear transmission permits synchronization of the position of the landing flaps with the wing flaps.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
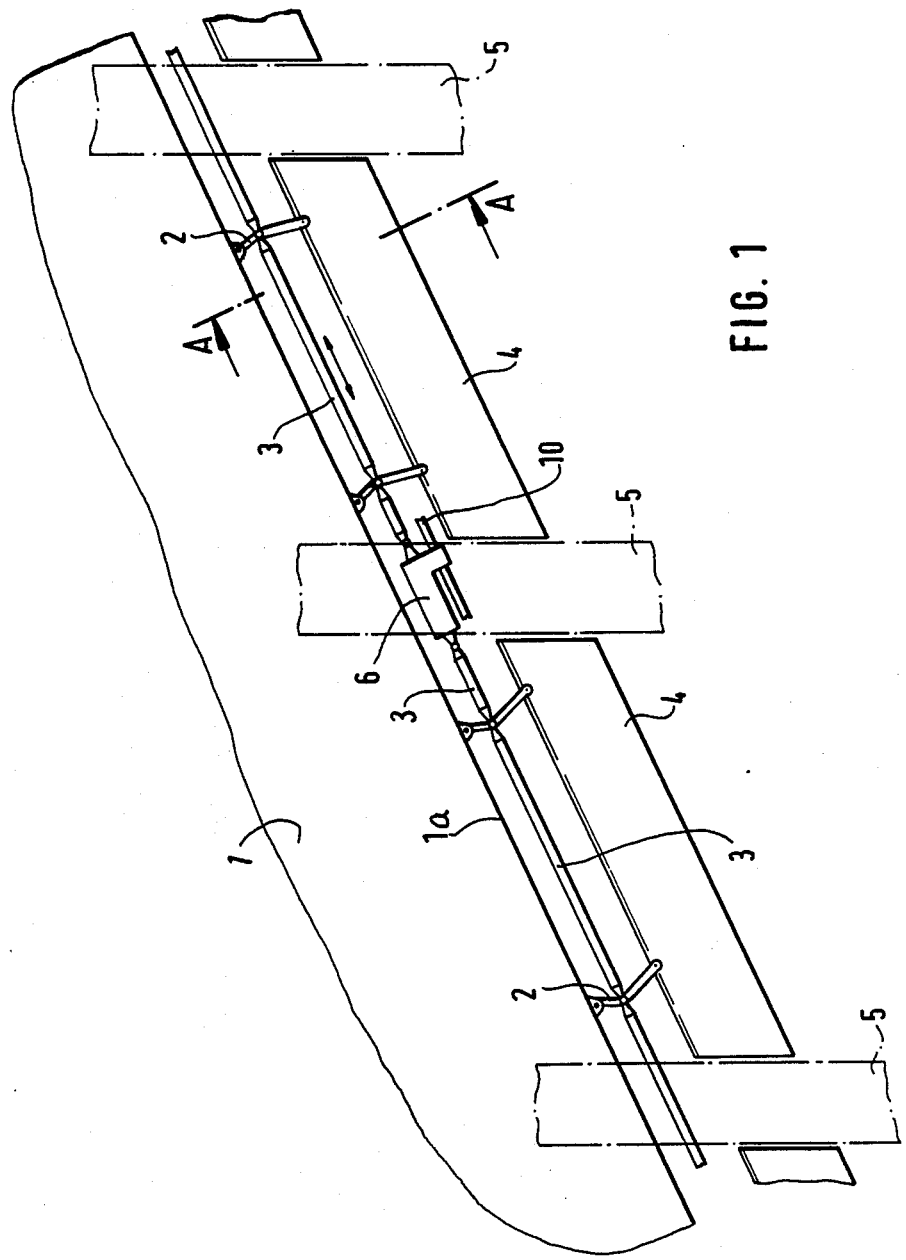
FIG. 1 is a top elevation of a wing and includes an arrangement that includes in turn linking transmission, tension rods, flaps and covers, all in the rear portion of an aircraft wing.

Proceeding now to the detailed description of the drawings, the figures and particularly FIG. 1 illustrate an example of the preferred embodiment for practicing the best mode of the invention. Reference numeral 1 refers to a wing having a trailing edge portion 1a.

Figure 2:
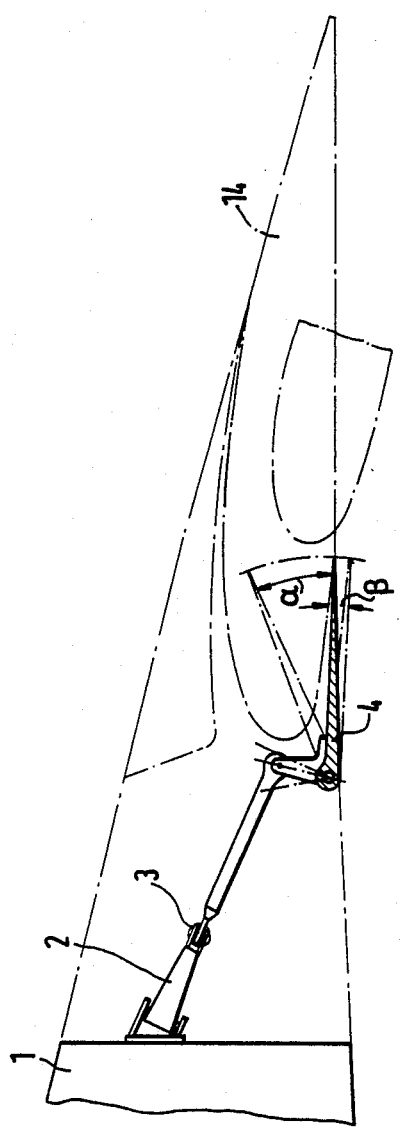
FIG. 2 is a section as indicated by AA in FIG. 1.

Inside the wing a control transmission and gear 6 is provided which is driven through a torsion shaft 10. This shaft 10 is driven elsewhere e.g. by a drive in the fuselage and in a manner known per se; the drive of the shaft 10 does not constitute a part of the invention. Moreover the torsion shaft may in addition drive the landing flap 14 (FIG. 2). One can say that known leading flap plus drive combinations are envisioned here and the inventive wing flaps are additionally linked to that drive structure as described. Reference numeral 5 refers to the cover for the drive structure for the landing flaps.

The transmission and gear 6 convert the rotation of shaft 10 into tension and compression forces which are transmitted upon tension-compression rods 3 respectively arranged to the left and right sides of gear 6. The tension compression rods 3 are respectively linked and articulated to elbow bent or angle levers 2 at the bed. The ends of the levers are connected to the trailing edge 1a and to flaps 4 respectively. The elbow or bent levers 2 are arranged such that the tension compression rods 3 will be loaded during the application tension more than during compression on account of the aerodynamic loads acting on the flaps 4. The torsion shaft 10, through the linkage transmission and gear 6, provides for thrust or tension movement which causes landing flap (14) movement to be synchronized with adjustment of wing flap 4 such that the gap as it occurs between the wing and the landing flap 14 are consistently covered during cruising, even though the wing chamber is changed through pivoting of the landing flap.

As shown in FIG. 2, illustrating a section in a plane identified by AA in FIG. 1, wing flap 4 will be deflected by operation of the rods 3 for angle alpha and beta maximum depending on the direction of flap pivoting. The pivot axes are horizontal. Since the operation for landing flap 14 is coupled to the operation of the wing flap 4, a change of the position of the landing flap 14 will provide for synchronous deflection of the wing flaps 4 by either of the angles stated above covering in each instance a particular range.

As can be seen best from FIG. 1, any of the wing flaps 4 is acted upon by two levers 2 and two rods 3, one pulling and the other pushing and for the sake of uniformity another rod 3 is interposed between the two levers 2 that act on one flap 4.

Figure 3:
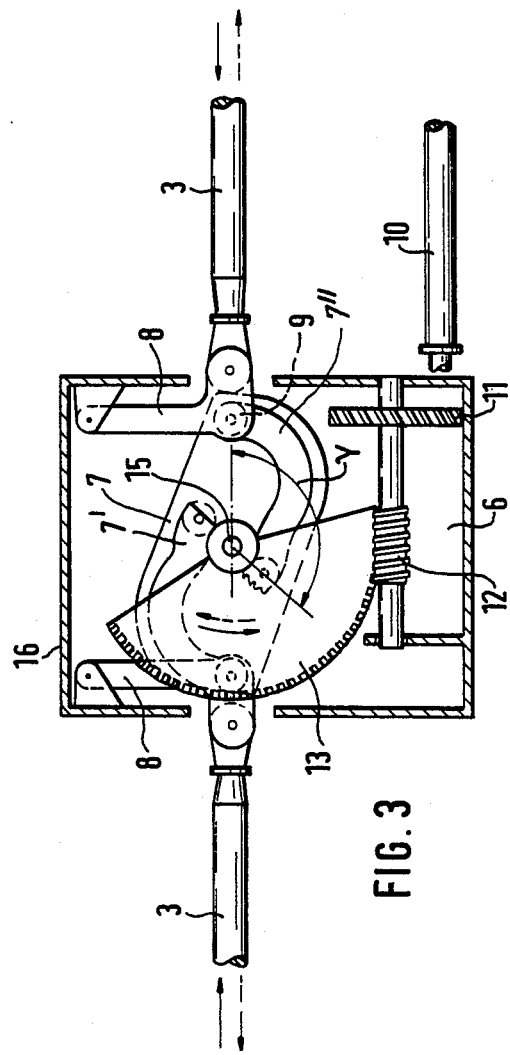
FIG. 3 illustrates the transmission linkage of the device shown in FIGS. 1 and 2 but in greater detail and in cross section.

FIG. 3 illustrates partially in section view of the linkage transmission gear 6 for the adjustment of wing flap 4. Drive energy is provided by and through the torsion shaft 10 and is picked up by a reducing worn transmission 11. A segment or section gear disk 13 is mounted to be capable of angular deflection by an angle gamma and operates a cam element 7 acting respectively on scanning or follower elements or rollers 9. The cam element has two follower guide slots 7' and 7" respectively for the two rollers 9. The follower rollers 9 are mounted on linkage levers 8 nd the rotational motion is converted into thrust or tension motion as the case may be. Owing to the motion of rods 3 and by operation of the elbow levers 2 the wing flaps 4 are now positioned as required.

In accordance with an advantageous configuration of practicing the invention the segment disk 13 and the cam disk 7 are mounted on the shaft 15 and are prevented from rotation relative to each other. Elements 7 and 13 rotate with shaft 15 in strict unison. The levers 8 are actually provided with a pair of rollers 9. The curved brakes 7' and 7" in cam disk 7 make sure that the rods 3 provided to the left and right of the transmission 6 are moved in opposite direction and that relieves the shaft 15.

The curved tracks on cam 7 are configured so that the deflection angles alpha or beta as the case may be, as well as a temporary stopping of the movement of the wing flap obtains when needed. Another advantage of the structure is that owing to the utilization of tension and compression rods a synchronous positioning of the flaps 4 is obtainable. While on the other hand shafts of similar dimensions do not provide torsionfree transmission of adjusting forces.

The invention is not limited to the embodiments described above but all changes and modifications thereof, not constituting departures from the spirit and scope of the invention, are intended to be included.

I claim:

1. Adjusting device for wing flaps, the flaps provided for covering a gap between a landing flap or flaps and a wing proper comprising:
   a driven torsion shaft;
   a transmission gear drivingly coupled to the torsion shaft and including a reducing gear and a gear segment bidirectionally driven by the reducing gear to cover at least a particular angle;
   cam means connected to and driven by the gear segment;
   a pair of levers with follower elements and disposed to be operated by the cam means on rotation thereof;
   a pair of tension-compression rods respectively linked to the levers of the pair such that the rods of the pair are operated in opposite direction; and
   a pair of elbow levers respectively connecting the rods to two wing flaps such that the rods are tension loaded then compression loaded by the aerodynamic forces acting on the wing flaps.

2. Device as in claim, constructed so that the wing flaps can be pivoted in opposite directions, out of a neutral position, by directional operation of the torsion shaft and the transmission means.

3. Device as in claim 1, the follower elements being rollers, the cam means having tracks defined by curved slots in a cam element.

* * * * *